3,594,329
REGENERATION OF ZINC CHLORIDE CATALYST
Everett Gorin, Pittsburgh, Robert T. Struck, Bridgeville, and Clyde W. Zielke, Pittsburgh, Pa., assignors to the United States of America as represented by the Secretary of the Interior and Consolidation Coal Company, Library, Pa., fractional part interest to each
Filed July 23, 1969, Ser. No. 844,201
Int. Cl. B01j *11/80, 11/04*
U.S. Cl. 252—417                                                     5 Claims

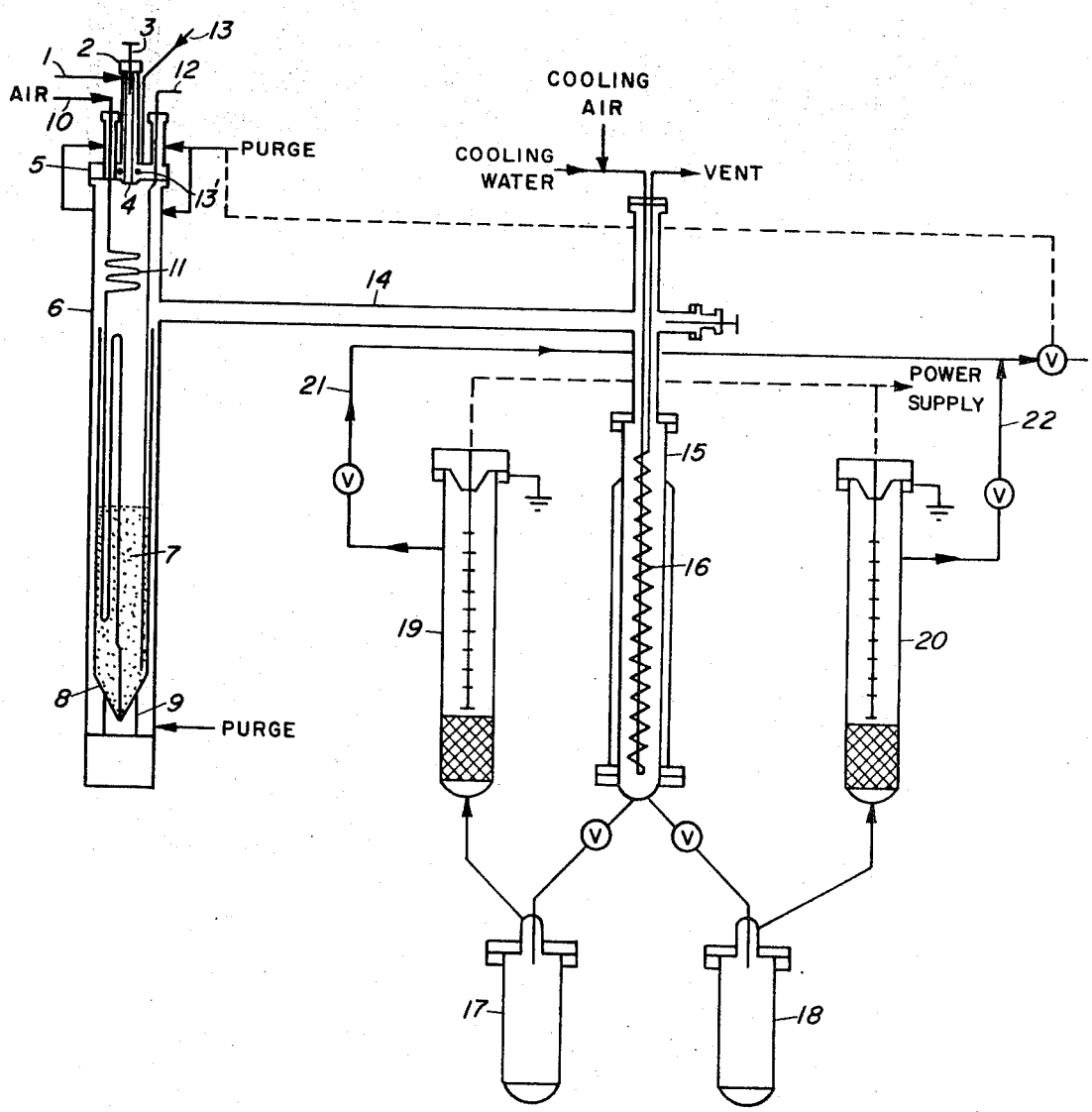

ABSTRACT OF THE DISCLOSURE

Spent zinc chloride catalyst is regenerated by combustion in the vapor phase in the presence of a fluidized refractory solid such as silica sand. Use of a near-stoichiometric amount of air results in substantially complete removal of sulfur, nitrogen and carbon impurities, while use of about 40 to 60% of the stoichiometric amount of air results in production of a low-sulfur fuel gas.

---

The use of molten zinc chloride as a catalyst for hydrocracking of polynuclear hydrocarbons, such as coal extract, is known and is disclosed, e.g., in U.S. Pat. 3,355,376. This patent also discloses regeneration of the catalyst by oxidation at elevated temperatures. It has now been found, according to the present invention, that the ease and efficiency of the regeneration is substantially improved by carrying out the regeneration process in a fluo-solids combustor, i.e., a combustor in which the combustion takes place in the presence of a fluidized solid. This is accomplished by feeding the spent zinc chloride melt into or onto a bed of refractory solid particles that are fluidized by the incoming combustion air.

Examples of suitable refractory solids are silica sand, alpha-alumina, aluminum silicates such as mullite, zinc spinels, zinc oxide sinter, etc.

Suitable operating temperature will generally be within the range of about 1600–2100° F. The maximum temperature is dictated by the point at which the solids become sufficiently "sticky" to effect defluidization. It is generally preferred to operate below 2000° F. for this reason. The minimum temperature is dictated by the point at which adequate reaction kinetics prevail for carbon combustion and nitrogen and sulfur removal from the melt feed. Normally, operating temperatures above 1700° F. are preferred. In general, the preferred operating temperature range is from 1750–1950° F.

Pressures in the range of 1–10 atmospheres may be employed. The optimum pressure is determined by economic considerations, i.e., higher pressures give higher capacity combustion and easier recovery of HCl and sulfur from the products of combustion. This must be balanced against the added cost of air compression and higher cost per unit vessel volume.

The superficial vapor residence time, i.e., bed height divided by superficial linear gas velocity, must be sufficiently long to complete the desired combustion reactions. Thus, at operating temperatures of 1800° F. or higher vapor residence times should be greater than 0.5 second and preferably greater than 1.0 second. As the temperature is increased, of course, the minimum required vapor residence time is decreased.

The superficial linear velocity may cover a rather wide range from 0.1 to 6.0 f.p.s. The higher velocities are desirable to acieve high capacities. However, at very high velocities poor fluidization characteristics are encountered which lead to slugging and inefficient combustion. Thus, preferred velocities in a commercial-scale unit are generally in the 1.5–3.0 f.p.s. range.

The size consist of the fluo-solids are chosen to match the fluidizing velocities used. The criteria are that the bed be well fluidized (bed expansion over the fixed bed is typically about 50–150%) and the terminal velocity of the smallest particle is such that it is not elutriated out of the bed. At constant fluidizing velocity the chosen size consist decreases with increasing particle density and decreasing operating pressure. Typically, particle size ranges used in the experimental work with several fluo-solids are given in the table below:

TABLE 1

| | Particle density, gm./cc. | Fluidizing velocity range, f.p.s. | Size consist, Tyler mesh |
| --- | --- | --- | --- |
| Material: | | | |
| Silica sand | 2.63 | 0.3–0.45 | 65×100 |
| Mullite | 3.32 | 0.15–0.3 | 100×150 |
| Do | 3.32 | 0.3–0.45 | 65×100 |
| Do | 3.32 | 0.9–1.4 | 35×65 |
| Do | 3.32 | 1.5–3.0 | 20×28 |
| ZnO sinter | 5.05 | 0.3–0.45 | 48×100 |

Zinc oxide formed during the oxidation of ZnS tends to deposit as a layer on the fluo-solids. The deposited layer tends to react chemically with acidic solids, such as silica, to form a layer of zinc silicate. Further deposition of ZnO occurs, however, until an equilibrium is reached when rate of removal of ZnO by attrition and carry-over as dust balances its rate of deposition.

The process is conducted adiabatically: therefore, the heat of combustion of the organic, $NH_3$ and ZnS impurities in the spent melt must be sufficiently great to vaporize the melt and to achieve the desired bed temperature. The ZnS content of the spent melt varies with the sulfur content of the feed extract to hydrocracking. Typically, however, the ZnS content will lie in the range of about 3–6 wt. percent of the spent melt when an extract from a high-sulfur eastern coal is processed and a weight ratio of $ZnCl_2$ extract of about 1.0 is used in hydrocracking. Similarly the $NH_3$ content of the spent melt normally lies in the range of about 1.2–1.8 wt. percent. The carbon content of the spent melt under these circumstances should be within the range of about 3.0–6.0 wt. percent, such that the adiabatic combustion temperature with stoichiometric air should lie within the range of about 1600–2100° F. This is illustrated by the calculated data given below for adiabatic combustion temperature with stoichiometric air preheated to 440° F. and melt feed at 800° F.

TABLE 2

| Example number | 1 | 2 |
| --- | --- | --- |
| Feed melt composition: wt. percent: | | |
| $NH_3$ | 1.6 | 1.5 |
| ZnS | 5.5 | 4.3 |
| C | 3.6 | 5.4 |
| Org. H, S and O | 0.4 | 0.5 |
| $ZnCl_2$ | 88.3 | 83.9 |
| ZnO-ash, etc. | 0.6 | 0.8 |
| $H_2O$ in melt | | 3.6 |
| Adiabatic temperature, °F | 1,700 | 2,060 |

The adiabatic temperature may be adjusted within relatively small limits for a given carbon content of the spent melt by increasing or decreasing preheat temperatures, particularly of the air. It is not, however, generally possible to sustain adequately high combustion temperatures if the carbon content of the melt is permitted to fall much below 3 wt. percent. On the other hand, if the carbon content of the melt exceeds about 6 wt. percent, then external cooling of the combustor will, in general, be required, even with no air preheat, to prevent the fluo-solids temperature from exceeding 2000° F.

It has been found that a particularly significant variable in the process of the invention is the percent of stoichiometric air that is employed. Stoichiometric air is defined as that amount of air which contains the theoretical amount of oxygen to completely burn the $NH_3$, $ZnS$ and organic residue contents of the spent melt according to the following equations:

$$NH_3 + \tfrac{3}{4}O_2 = \tfrac{1}{2}N_2 + \tfrac{3}{2}H_2O$$

$$ZnS + \tfrac{3}{2}O_2 = ZnO + SO_2$$

$$CH_x + (1+x/4)O_2 = CO_2 + x/2 H_2O$$

When nearly stoichiometric air, i.e., about 90–110% of the stoichiometric amount, is used, nearly all the $NH_3$, $ZnS$ and organic residue are removed from the melt by combustion. When operating with slightly less than stoichiometric air the resultant gas is very low in oxygen content. Also, by slight adjustment of the air input, i.e., to about 95% of the stoichiometric amount, sufficient CO can be generated to effect recovery of $SO_2$ as elementary sulfur by a secondary catalytic treatment of the resultant flue gas to effect the reaction, $$2CO + SO_2 \rightarrow 2CO_2 + S$$

Significant quantities of HCl are usually generated in the process, probably by hydrolysis of $ZnCl_2$ vapor by steam generated in the combustion process. The reaction is, $$ZnCl_2 + H_2O \rightarrow ZnO + 2HCl$$

The HCl may be recovered in scrubbers by reversal of this reaction at lower temperatures, e.g., about 650° F. ZnO used as a slurry in $ZnCl_2$ melt for neutralization of the HCl is carried into the scrubbers as dust from the combustor.

When a low fraction of the stoichiometric air, i.e., about 30 to 70 percent, preferably about 40 to 55 percent, is used, the process results in generation of a low-B.t.u., low-sulfur fuel gas, provided sufficient residence time of the gas is provided. Such a gas is useful, e.g., as reformer furnace fuel. Large amounts of CO and $H_2$ are produced by incomplete combustion and also by secondary gasification of unburned carbon by $CO_2$ and $H_2O$. Undoubtedly, $SO_2$ is generated in the lower part of the fluo-solids bed (near the air inlet) by roasting of the ZnS, i.e., by the reaction, $$ZnS + \tfrac{3}{2}O_2 = ZnO + SO_2$$

However, if sufficiently long vapor residence times are used, the following reactions tend to proceed to completion:

$$CO + H_2O = CO_2 + H_2$$

$$3H_2 + SO_2 = H_2S + 2H_2O$$

$$H_2S + ZnO = ZnS + H_2O$$

The zinc oxide coating on the fluo-solids thus acts as a sulfur acceptor and the gas produced is almost completely free of sulfur. Vapors of HCl are recovered from the primary gas stream in the same way as in the process using near-stoichiometric air.

The ZnS is largely retained in the fluo-solids bed. The fluosolids in practice would thus be periodically withdrawn and roasted in a separate step with air to produce ZnO and a concentrated $SO_2$ stream. The ZnO is returned with the regenerated melt to the hydrocracking step.

This process, however, generally requires a feedstock with a higher organic residue content to achieve the desired adiabatic combustion temperature in the preferred range of 1750–1950° F. For example, a normal spent $ZnCl_2$ melt containing about 1.5 wt. percent $NH_3$ and 3.5 percent ZnS should have an organic residue content from hydrocracking of extract (excluding unburned carbon recycled through the combustor) greater than about 8 wt. percent of the spent melt to achieve the desired adiabatic temperature within the preferred operating range when using less than about 55% of stoichiometric air.

As the organic residue content increases, the amount of stoichiometric air must be reduced in order to prevent the adiabatic temperature from increasing beyond the desired upper operating limit. However, if the amount of stoichiometric air is reduced below 30–35%, the amount of unburned carbon recycle tends to become excessive. The above considerations limit the organic residue content of the spent melt to a maximum of about 20 wt. percent (again recycled unburned carbon is excluded). If it is desired to handle spent melts in this way with even larger amounts of organic residue, $CO_2$ should be blended with the air feed to act as a endothermic gasification agent.

The residence time in the combustor must exceed a certain minimum for three reasons: The minimum residence time first of all appears to be dictated by the time required for the reduction of $SO_2$ by the reaction, $$3H_2 + SO_2 = 2H_2O + H_2S$$

the $H_2S$ apparently being rapidly removed by the acceptor reaction, $$ZnO + H_2S = ZnS + H_2O$$

The $SO_2$ reduction reaction is susceptible to different catalytic influences such that the residence time required depends upon the particular fluo-solids used. Iron sulfide, in particular, is a useful catalyst for this reaction and may be added to the fluo-solids, if desired. Accordingly, the minimum residence time varies with the particular fluo-solids used but, in general, should be greater than about 2 seconds. The second reason for a minimum residence time is to achieve a high heating value in the outlet gas and maximum carbon burnout. The required residence time here decreases with increasing temperature, but should be greater than 2 seconds at 1800° F. Finally, sufficient residence time is also required to achieve adequate thermal decomposition of the $NH_3$.

Intermediate operation, i.e., between about 70 and 90 percent of stoichiometric air, is also feasible but has the disadvantages that (1) the B.t.u. content of the gas is too low and its sulfur content too high for use as a fuel gas and (2) rejection of sulfur in a single oxidation stage is incomplete.

The invention will be more particularly illustrated by the following examples.

EXAMPLES 1–5

These examples illustrate the process of the invention using relatively high fractions of the stoichiometric amount of air. The apparatus used is shown diagrammatically in the figure and the process will be described by reference to the figure.

The melt feed is fed via line 1 to inlet tube 2, provided with rod 3 for mechanically clearing tube 2 if a plug should develop. The melt is then dropped from drip tip 4 in the top flange 5 of combustor 6 (3½" Sch. 40 Inconel 600) into the fluo-solids bed 7 (bed depth: 12–16"). The fluo-solids are contained in mullite reactor liner 8 (2⅜" I.D. x 28"), supported by mullite support 9. The fluidizing air is supplied via line 10 and preheater tube 11 that enters the combustor at the upper flange and extends to within about ¾" of the tip of the liner cone where it discharges into the fluo-solids bed. The top flange of the combustor is also provided with thermocouple well 12 and cooling air inlet 13 and outlet 13'.

Vapors from the combustor are conducted via line 14 to condenser 15 (2" Sch. 40 Inconel 600, 32" long), provided with cooling coil 16 and cooling air, where they are cooled to a temperature of about 650–700° F. and where the $ZnCl_2$ condenses and HCl and ZnO, formed by hydrolysis in the oxidation zone, interact to re-form $ZnCl_2$ and $H_2O$. These products are collected in balance melt receiver 17 or in lineout receiver 18, both kept at temperatures of about 650° F.

Residual $ZnCl_2$ fog from the condenser is removed from the gas stream by electrostatic precipitator 19 or 20 (balance and lineout, respectively; 3" Sch. 10 x 27" long), also kept at about 650° F., i.e., above the melting point of $ZnCl_2$.

The effluent gas from the precipitators, via lines 21 and 22, is then treated according to conventional procedures, not illustrated in the figure. The effluent gas, essentially $ZnCl_2$-free, is passed through a cooler where water and some HCl are removed. A small side stream of the dry gas is then passed through an Ascarite trap to remove acid gases and then to a Beckman Model E–2 oxygen analyzer. The main stream of dry gas is passed through tandem scrubbers containing aqueous hydrogen peroxide which removes $SO_2$ plus CHI and aqueous sodium hydroxide which removes $CO_2$ from the product gas. A fraction of the offgas is diverted to a gas holder and the remainder is metered and vented.

To charge the fluo-solids bed and start a run, the thermowell of the combustor is replaced with a tube surmounted by a closed hopper containing fluo-solids. The fluidizing air and argon purge flows are then established, and the fluo-solids are charged to the reactor held at 1200–1400° F. After replacing the thermowell, the desired pressure is established, and the combustor is heated to about 50° F. below the desired run temperature. The feed is then started with the vapors going to the line-out train. When all temperatures are lined out and the oxygen content of the effluent gas is constant, the vapors are diverted through the balance train to start the balance period. The weight of melt fed during the balance varied from 900 to 6700 grams, depending on the feed rate.

All products, including the fluo-solids, are collected and analyzed. Determinations are made of chlorine on the product water, chlorine and sulfur on the hydrogen peroxide scrubber effluent, and chlorine and $CO_2$ on the sodium hydroxide scrubber effluent to obtain the amounts of HCl, $SO_2$ and $CO_2$ collected in these materials. The scrubbed gas collected in the gas holder is analyzed for H, CO, $CO_2$, $SO_2$, $N_2$, A and $O_2$ by two-stage gas chromatography. The results from the water, scrubbers, and gas holder are consolidated to obtain the effluent gas composition. Material balances and elemental balances are made. The amount of ammonia decomposition is determined by the difference between inorganic nitrogens in the feed and effluent melts. The amounts of ZnS and $NH_3$ in the melts are determined by elemental analyses of the fractions produced by washing with water, benzene, and methyl ethyl ketone.

Superficial air velocity is defined as the velocity of the air feed at process conditions based on the empty reactor. Superficial residence time is based on the superficial velocity and the fluo-solids bed depth.

Reaction conditions and results are given in Table 3. The melt feed employed was that of Example 2 in Table 2, above.

TABLE 3

| Example No. | 1 | 2 | 3 | 4 | 5 |
| --- | --- | --- | --- | --- | --- |
| Percent of stoichiometric air | 116 | 108 | 90 | 77 | 75 |
| Superficial air velocity, f.p.s. | 0.41 | 0.38 | 0.42 | 0.42 | 1.05 |
| Superficial residence time, sec. | 2.44 | 2.63 | 2.39 | 2.38 | 0.90 |
| Temperature, ° F. | 1,800 | 1,800 | 1,800 | 1,800 | 1,801 |
| Pressure, p.s.i.a. | 15.6 | 16.9 | 15 | 15.2 | 46 |
| Melt feed rate, lb./(hr.)(ft.$^2$) | 28.6 | 31.0 | 34 | 54.5 | 347 |
| Results: | | | | | |
| Percent $NH_3$ burned to $N_2+H_2O$ | 98 | 89 | 70 | 58 | ~50 |
| Percent C burned to $CO+CO_2$ | 100 | 94 | 92 | 90 | 92 |
| Percent inorganic S burned to $SO_2$ | 100 | 100 | 95 | 29 | 28 |
| HCl produced, wt. percent feed melt | 3.4 | 2.0 | 2.9 | 3.6 | 2.5 |
| Dry exit gas, vol. percent: | | | | | |
| $SO_2$ | 1.44 | 1.43 | 1.49 | 0.52 | 0.55 |
| CO | 2.00 | 2.62 | 3.57 | 4.77 | 5.76 |
| $O_2$ | 2.57 | 2.57 | 0.23 | 0.05 | 0.00 |
| Exit gas heating value, gross B.t.u./ft.$^3$ | 6.6 | 8.7 | 11.7 | 17 | 24.5 |

Noteworthy is the rapid decrease in the fraction of the inorganic sulfur burned as the percent of stoichiometric air is decreased below 90%. Thus, adequate removal of inorganic sulfur dictates operation with about 90% or greater of stoichiometric air. Furthermore, wasteful generation of CO occurs as the amount of stoichiometric air is reduced below about 90%. The amount of CO generated becomes more than required to reduce the $SO_2$ to elementary sulfur, but the heating value of the gas is too low to be useful as a fuel gas until the percent of stoichiometric air drops below 70%.

EXAMPLES 6–10

These examples illustrate the process of the invention using relatively low fractions of stoichiometric air, with production of a low-sulfur fuel gas. The apparatus and procedure were essentially the same as that employed in Examples 1–5. Three of the runs were made with a spent melt and one was made with a synthetic melt. Compositions are given in Table 4.

TABLE 4.—ANALYSIS OF MELTS USED

| | "High" carbon spent melt No. 3 | Synthetic melt No. 4 |
| --- | --- | --- |
| Feed melt composition, wt. percent: | | |
| $NH_3$ | 1.35 | 1.37 |
| ZnS | 3.6 | 4.57 |
| C | 8.76 | 5.78 |
| Org. H, N, S+O | 0.7 | 0.6 |
| $ZnCl_2$ | 80.7 | 84.7 |
| ZnO | 1.4 | 0.70 |
| $H_2O$ in melt | 3.5 | 2.3 |

Reaction conditions and results are given in Table 5:

TABLE 5

| | Melt used | | | | |
| --- | --- | --- | --- | --- | --- |
| | No. 3 | No. 3 | No. 3 | No. 3 | No. 4 |
| | Ex. 6 | Ex. 7 | Ex. 8 | Ex. 9 | Ex. 10 |
| Percent of stoichiometric air | 58 | 59 | 56 | 44 | 65 |
| Superficial velocity, ft./sec. | 0.41 | 1.42 | 0.16 | 0.16 | 0.38 |
| Superficial residence time, sec. | 2.44 | 2.38 | 6.25 | 6.25 | 2.63 |
| Temperature, ° F. | 1,800 | 1,900 | 1,800 | 1,800 | 1,800 |
| Pressure, p.s.i.a. | 15.3 | 15.2 | 15.0 | 14.8 | 16.9 |
| Melt feed rate, lbs./(hr.)(ft.$^2$) | 37.2 | 36.9 | 14.1 | 17.6 | 48.5 |
| Fluo-solids used | (1) | (1) | (2) | (2) | (3) |
| Results: | | | | | |
| Percent $NH_3$ decomposed | 28 | 70 | 52 | 62 | 88 |
| Percent C burned to $CO+CO_2$ | 72 | 75 | 84 | 78 | 91 |
| Percent inorganic S burned to $SO_2$ | 28 | 24 | 0 | 1.5 | 3 |
| HCl product, wt. percent feed melt | 2.6 | 2.9 | 3.2 | 2.0 | 2.0 |
| Dry exit gas, vol. percent: | | | | | |
| $CO_2$ | 13.2 | 12.7 | 9.9 | 9.2 | 13.1 |
| CO | 6.2 | 6.9 | 10.8 | 13.4 | 7.4 |
| $H_2$ | 4.8 | 7.8 | 7.8 | 11.7 | 1.6 |
| $SO_2$ | 0.38 | 0.33 | 0.00 | 0.03 | 0.05 |
| $N_2$ | 72.7 | 69.4 | 68.5 | 63.5 | 75.3 |
| $O_2$ | 0.0 | 0.0 | 0.0 | 0.0 | 0.0 |
| HCl | 2.7 | 2.9 | 3.0 | 2.2 | 2.7 |
| Dry exit gas gross heating value, B.t.u./ft.$^3$ | 35 | 47 | 60 | 81 | 29 |

[1] Mullite 65×100 M.
[2] Mullite 100×150 M.
[3] Silica sand 65×100.

It will be seen that with 56% stoichiometric air a substantially sulfur-free fuel gas having a heating value of 60 B.t.u./ft.$^3$ is produced at 1800° F. from the "high carbon" melt, if the gas residence time is relatively long, i.e., 6.25 seconds. Sulfur dioxide appears in the gas in substantial quantities, however, when the gas residence time is decreased to 2.4 seconds. It is noted that the heating value also decreases to 35. Increasing the temperature to 1900° F. increases the heating value of the gas to 47, and also reduces slightly the sulfur content. Apparently, even at 1900° F. a residence time larger than 2.5 seconds is needed to achieve a low-sulfur fuel gas.

The example with the "synthetic" melt No. 4 shows that under certain conditions a low-sulfur fuel gas can be produced even with as high as 65% stoichiometric air. The residence time here was relatively short also, i.e., 2.63 seconds. The improved results are probably due to catalysis of $SO_2$ reduction by silica sand which was used as the fluo-solids in this case. Reduction of the amount of stoichiometric air further increases the heating value of the fuel gas to 81, cf. Example 9.

What is claimed is:

1. A method for regeneration of molten spent zinc chloride catalyst from hydrocracking of hydrocarbons, and containing about 3 to 6 weight percent of zinc sulfide and about 3 to 6 weight percent of carbon, consisting essentially of providing a fluidized bed of refractory solid particles from the group consisting of silica sand, mullite and zinc oxide sinter, said particles being fluidized by combustion air maintained at a temperature of about 1600 to 2100° F.; introducing the spent zinc chloride in vapor form into the fluidized bed of refractory solid particles and maintaining said zinc chloride in vapor form in contact with the fluidized bed of refractory solid particles for a time sufficient to oxidize a major portion of $NH_3$, ZnS and organic contaminants in the spent catalyst.

2. The method of claim 1 in which the spent zinc chloride catalyst is a by-product of the hydrocracking of polynuclear hydrocarbons.

3. The method of claim 2 in which the hydrocarbon is coal extract.

4. The method of claim 1 in which the amount of combustion air employed is about 90 to 110 percent of the stoichiometric amount necessary to completely oxidize $NH_3$, ZnS and organic contaminants in the spent catalyst.

5. The method of claim 1 in which the amount of combustion air employed is about 30 to 70 percent of the stoichiometric amount and the product is a low-sulfur fuel gas.

References Cited

UNITED STATES PATENTS

| | | | |
|---|---|---|---|
| 2,395,263 | 2/1946 | Foster | 23—288X |
| 2,797,981 | 7/1957 | Tooke | 23—96 |
| 3,355,376 | 11/1967 | Gorin et al. | 208—10 |

DANIEL E. WYMAN, Primary Examiner

P. E. KONOPKA, Assistant Examiner

U.S. Cl. X.R.

23—288S, 97; 48—196FM; 252—373